(12) United States Patent
Wafzig

(10) Patent No.: US 10,816,061 B2
(45) Date of Patent: Oct. 27, 2020

(54) DUAL-CLUTCH TRANSMISSION

(71) Applicant: ZF Friedrichshafen AG, Friedrichshafen (DE)

(72) Inventor: Jürgen Wafzig, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 469 days.

(21) Appl. No.: 15/559,626

(22) PCT Filed: Feb. 24, 2016

(86) PCT No.: PCT/EP2016/053801
§ 371 (c)(1),
(2) Date: Sep. 19, 2017

(87) PCT Pub. No.: WO2016/150636
PCT Pub. Date: Sep. 29, 2016

(65) Prior Publication Data
US 2018/0058548 A1 Mar. 1, 2018

(30) Foreign Application Priority Data
Mar. 24, 2015 (DE) .......................... 10 2015 205 307

(51) Int. Cl.
*F16H 3/00* (2006.01)
*F16H 3/093* (2006.01)
*F16H 3/08* (2006.01)

(52) U.S. Cl.
CPC ............. *F16H 3/093* (2013.01); *F16H 3/006* (2013.01); *F16H 2003/0807* (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 8,171,813 B2 * 5/2012 Gumpoltsberger ..... F16H 3/006
74/330
8,720,290 B2 * 5/2014 Baldwin ................. F16H 3/006
74/330
(Continued)

FOREIGN PATENT DOCUMENTS

| DE | 10015336 A1 | 10/2001 |
| DE | 102009002342 A1 | 10/2010 |
| DE | 102013108455 A1 | 2/2015 |

OTHER PUBLICATIONS

German Search Report DE102015205307.5, dated Dec. 2, 2015. (7 pages).
(Continued)

*Primary Examiner* — Ha Dinh Ho
(74) *Attorney, Agent, or Firm* — Dority & Manning, P.A.

(57) ABSTRACT

The invention proposes a dual-clutch transmission with two clutches (K1, K2), the input sides of which are connected with an input shaft (w_an) and the output sides of which are respectively connected with one of two coaxially disposed transmission input shafts (w_K1, w_K2). Further provided are at least two countershafts (w_v1, w_v2) on which idlers (i2, i3, i4, i5, iR) are rotatably mounted. The dual-clutch transmission comprises fixed gears (F1, F2, F3), which are disposed on the two transmission input shafts (w_K1, w_K2) in a rotationally fixed manner and in engagement with the idlers, and output gears (iab1, iab2) respectively provided on the two countershafts (w_v1, w_v2), each of which is coupled to a gearing of an output shaft (w_ab), wherein the output shaft (w_ab) is not coaxially disposed to the input shaft (w_an). A plurality of shift elements (S1, S2, S3) is provided as well, so that at least six power-shiftable forward gears (1, 2, 3, 4, 5, 6) and at least one reverse gear (R1, R2) are shiftable. Only three double-acting shift elements (S1, S2, S3) are provided according to the invention,
(Continued)

wherein two idlers (i2, i3, i4, i5, iR) of the countershafts (w_v1, w_v2) are allocated to each double-acting shift element (S1, S2, S3), wherein, in a first operating direction (S1a), one of the shift elements (S1) connects an idler (i3) with the associated countershaft (w_v1) and, in a second operating direction (S1b), connects the two associated idlers (i3, i4) with one another, and wherein two shift elements (S2, S3) respectively connect the associated idlers (i2, i5; i4, iR) with the associated countershafts (w_v1, w_v2) in a rotationally fixed manner.

12 Claims, 1 Drawing Sheet

(52) U.S. Cl.
CPC ............... *F16H 2003/0826* (2013.01); *F16H 2003/0931* (2013.01); *F16H 2200/0052* (2013.01); *F16H 2200/0086* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 9,162,667 B2* | 10/2015 | Cho | B60W 20/00 |
| 9,618,086 B2* | 4/2017 | Lin | F16H 3/006 |
| 9,644,708 B2* | 5/2017 | Gwon | F16H 3/006 |
| 2007/0051196 A1 | 3/2007 | Baldwin | |
| 2010/0257955 A1 | 10/2010 | Rieger et al. | |
| 2010/0257967 A1* | 10/2010 | Rieger | F16H 3/006 |
| | | | 74/331 |
| 2010/0269611 A1* | 10/2010 | Rieger | F16H 3/006 |
| | | | 74/331 |

OTHER PUBLICATIONS

International Search Report (English Translation) PCT/EP2016/053801, dated May 24, 2016. (2 pages).

* cited by examiner

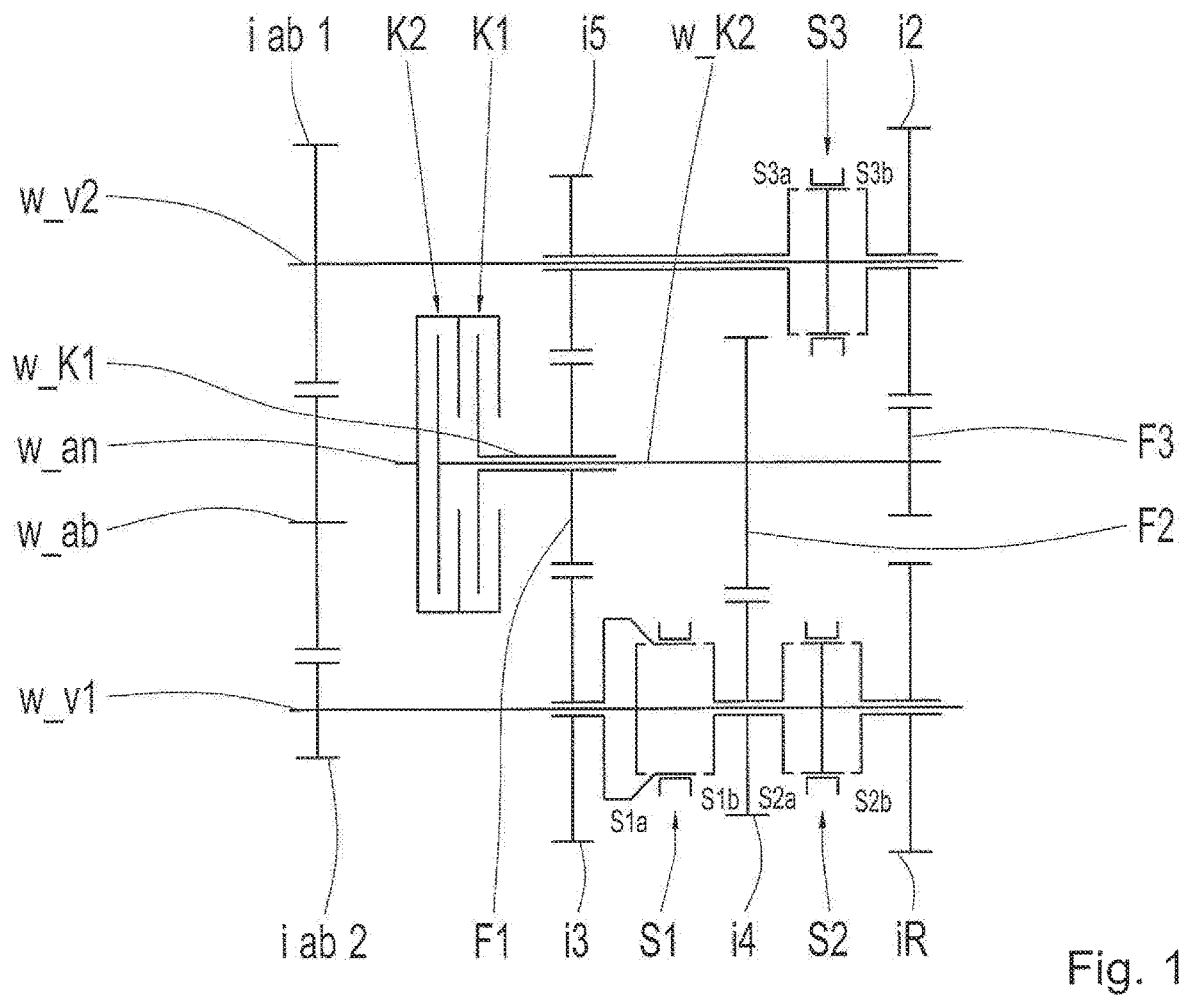

DUAL-CLUTCH TRANSMISSION

FIELD OF THE INVENTION

The present invention relates generally to a dual-clutch transmission.

BACKGROUND

A dual-clutch transmission is known from publication DE 10 2009 002 342 A1, for example, in which, for a front-transverse installation in the vehicle, the input shaft (i.e., drive shaft) and the output shaft are not coaxially disposed. The seven-gear dual-clutch transmission includes two clutches, the input sides of which are connected to the input shaft and the output sides of which are respectively connected with one of two coaxially disposed transmission input shafts. Two countershafts are provided as well, on which gear wheels configured as idlers are rotatably mounted. Gear wheels, which are configured as fixed gears and are at least partly in engagement with the idlers, are disposed on the two transmission input shafts in a rotationally fixed manner. To connect the idlers with the respective countershaft, at least six switching points, which can be actuated by two single-acting shift elements and two double-acting shift elements, are provided. Output gears, which are respectively coupled to a gearing of the output shaft, are provided on the two countershafts as constant pinions or output constants.

The technical complexity of dual-clutch transmissions grows linearly as the number of gears increases. As a result, more and more gears, shift elements and with it also shift actuators are needed. To be able to realize the desired gear ratios, at least five shift actuators are needed in the known dual-clutch transmission.

SUMMARY OF THE INVENTION

Example aspects of the present invention provide a fully power-shiftable dual-clutch transmission with at least six forward gears and one or more reverse gears, and including the least possible number of shift actuators for actuating the shift elements.

Thus, a space-optimized dual-clutch transmission in particular for front-transverse or rear-transverse installation in a vehicle is proposed, wherein two clutches are provided, the input sides of which are connected to an input shaft (also referred to herein as a "drive shaft") and the output sides of which are respectively connected to one of, for example, two coaxially disposed transmission input shafts. The dual-clutch transmission includes at least two countershafts on which idlers are rotatably mounted as gear stages for the transmission stages, wherein fixed gears, which are disposed on the two transmission input shafts in a rotationally fixed manner, are in engagement with the idlers. The transmission further includes an output gear respectively provided on the two countershafts, each of said output gears is coupled to a gearing of an output shaft, wherein the output shaft is not disposed coaxially, i.e. axis parallel, to the input shaft, so as to be able to realize a front or rear-transverse installation. A plurality of shift elements is additionally provided, so that at least six power-shiftable forward gears and at least two reverse gears are shiftable.

According to example aspects of the invention, three double-acting shift elements are provided, which are actuatable by only three shift actuators, wherein two idlers of the countershafts are allocated to each double-acting shift element, wherein, in a first operating direction, one of the shift elements connects an idler with the associated countershaft and, in a second operating direction, connects the two associated idlers with one another, and wherein two shift elements respectively connect the associated idlers with the associated countershafts in a rotationally fixed manner.

A six-speed dual-clutch transmission with only three shift actuators with lateral output is thus proposed, so that six switching points can be actuated by the three double-acting actuators. The inventive dual-clutch transmission represents an optimum compromise between an adequate number of gears and gear ratio spread, at a minimum possible number of transmission components and actuators.

According to an advantageous further example embodiment of the present invention, it can be provided that the first shift element and the second shift element are allocated to the first countershaft, and that the third shift element is allocated to the second countershaft. The actuation of each dual shift element via the respective associated shift actuator can be mechanical, hydraulic, pneumatic or even electric, preferably from the inside of the countershafts out. Interior actuation is particularly space-saving. However, for arrangement reasons, an exterior actuation may potentially be provided as well. The shift elements themselves can be designed as friction locking or positively locking shift elements. Synchronizations or shifting dogs, for example, can be provided as well.

The two countershafts are preferably arranged axially parallel to one another. If necessitated by the available installation space, a coaxial arrangement of the countershafts would be conceivable as well.

A hybridization of the proposed dual-clutch transmission is possible, independent of the respective design variants. In doing so, at least one electric motor, for example, can be connected with the input side of the clutches and/or with one of the idlers and/or also with one of the countershafts. The connection may also be realized in a shiftable manner.

The proposed dual-clutch transmission can preferably be equipped with an integrated output step. As an output gear, the output step can include a fixed gear on the output shaft, which is in engagement with both a first output gear as a fixed gear of the first countershaft and a second output gear as a fixed gear of the second countershaft. However, it is also possible that at least one of the output gears is configured as a shiftable gear.

The proposed dual-clutch transmission can preferably be used as an automatic transmission in vehicles, in particular motor vehicles, wherein a front or rear-transverse installation is provided for lateral input and output by the non-coaxial arrangement of input shaft and output shaft.

BRIEF DESCRIPTION OF THE DRAWINGS

Example aspects of the present invention are explained in more detail below with reference to the drawings. In the drawings:

FIG. 1 a schematic view of a design variant of a six-speed dual-clutch transmission according to example aspects of the invention; and FIG. 2 an engagement sequence table of the wheel set shown in FIG. 1.

FIG. 1 shows an example of a possible design of a wheel set for a dual-clutch transmission with preferably six forward gears and two reverse gears, for example, whereas FIG. 2 shows a possible engagement sequence table for the illustrated design.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The six-speed dual-clutch transmission includes two clutches K1, K2 as a dual clutch, the input sides of which are connected to an input or drive shaft w_an and the output sides of which are respectively connected with one of two coaxially disposed transmission input shafts w_K1, w_K2. In the illustrated design variant, the first transmission input shaft w_K1 is designed as a hollow shaft and includes a fixed gear F1. In the illustrated design variant, the second transmission input shaft w_K2 is designed as a solid shaft and includes a first fixed gear F2 and a second fixed gear F3.

The proposed dual-clutch transmission further includes two countershafts w_v1, w_v2 on which idlers i2, i3, i4, i5, iR are rotatably mounted. In the illustrated design variant, the first countershaft w_v1 and the second countershaft w_v2 are axially parallel, and thus, for example, disposed as spatially offset from one another.

Overall, the two countershafts w_v, w_v2 are allocated to only three dual shift elements S1, S2, S3, with which the idlers i2, i3, i4, i5, iR, which are in engagement with the fixed gears F1, F2, F3 of the transmission input shafts w_K1, w_K2, can be connected with the associated countershaft w_v1, w_v2 in a rotationally fixed manner, to shift the six power-shiftable forward gears 1, 2, 3, 4, 5, 6, and at least the two reverse gears R1, R2.

According to example aspects of the invention, it is provided that each one of the three double-acting shift elements S1, S2, S3 is actuatable with only one associated shift actuator, so that only three actuators are required, wherein two idlers i2, i3, i4, i5, iR of the countershafts w_v1, w_v2 are allocated to each of the double-acting shift element S1, S2, S3. In doing so, it is provided that, in a first operating direction S1a, the first shift element S1 connects the idler i3 with the associated first countershaft w_v1 as a gear stage of the third forward gear 3 and, in a second operating direction S1b, connects the two associated idlers i3, i4 with one another in a rotationally fixed manner as gear stages of the third and fourth forward gear 3, 4, wherein the second and third shift element S2, S3 respectively connect the associated idlers i4, i5; i4, iR with the associated countershafts w_v1, w_v2 in a rotationally fixed manner.

An associated shift actuator controlled double-acting first shift element S1 is thus allocated to the idler i3 as a gear stage of the third forward gear 3 in operating direction S1a and to the idler i4 as a gear stage of the fourth forward gear 4 in operating direction S1b. An associated shift actuator actuated double-acting second shift element S2 is allocated to the idler i4 as a gear stage of the fourth forward gear 4 in operating direction S2a and to the idler iR as a gear stage of the reverse gear R1, R2 in operating direction S2b. An associated shift actuator actuatable double-acting third shift element S3 is allocated to the idler i2 as a gear stage of the second forward gear 2 in operating direction S3b and to the idler i5 as a gear stage of the fifth forward gear 5 in operating direction S3a.

Two output gears iab1, iab2, which are disposed on the two countershafts w_v1, w_v2 and respectively coupled to a gearing of an output shaft w_ab, are provided as an output. The two output gears, i.e. output constants, iab1, iab2 form the output gear plane or level, which enables a lateral output axis parallel to the input shaft w_an.

An additional three gear planes or levels, which are axially offset or parallel to the output gear plane or level, are provided. In a first gear level, the fixed gear F1 of the first transmission input shaft w_K1 is in engagement with both the idler i3 as a gear stage, i.e. spur gear stage, of the third forward gear 3 of the first countershaft w_v1 and the idler i5 as a gear stage of the fifth forward gear 5 of the second countershaft w_v2. In the second gear level, the first fixed gear F2 of the second transmission input shaft w_K2 is in engagement with the idler i4 as a gear stage of the fourth forward gear 4 of the first countershaft w_v1. Finally, in a third gear level, the second fixed gear F3 of the second transmission input shaft w_K2 is in engagement with the idler i2 as a gear stage of the second forward gear 2, wherein, to reverse rotation to realize the reverse gear ratios, the idler i2 is in engagement with the idler iR as a gear stage of the reverse gear R1, R2 of the first countershaft w_v1.

The table in FIG. 2 shows an example of an engagement sequence table for the illustrated wheel set of the six-speed dual-clutch transmission.

The engagement sequence table shows that the first forward gear 1 can be shifted via the first clutch K1 and via the first shift element S1 activated in direction S1b and via the third shift element S3 activated in operating direction S3b. The second forward gear 2 can be shifted via the second clutch K2 and via the third shift element S3 actuated in operating direction S3b. The third forward gear 3 can be shifted via the first clutch K1 and via the first shift element S1 actuated in operating direction S1a. The fourth forward gear 4 can be shifted via the second clutch K2 and via the second shift element S2 actuated in operating direction S2a. The fifth forward gear 5 can be shifted via the first clutch K1 and via the third shift element S3 actuated in operating direction S3a. The sixth forward gear 6 can be shifted via the second clutch K2 and via the first shift element S1 activated in operating direction S1b as well as via the third shift element S3 actuated in operating direction S3a. A reverse gear R1 is shiftable via the first clutch K1 and via the first shift element S1 activated in operating direction S1b, as well as via the second shift element S2 in operating direction S2b, and a further reverse gear R2 is shiftable via the second clutch K2 and via the second shift element S2 activated in operating direction S2b.

The following power flow thus results for the illustrated gear ratio: starting from the first clutch K1, the first forward gear 1 is shiftable via the first transmission input shaft w_K1, wherein when the first shift element S1 is activated in operating direction S1b, the power flow is transmitted over the idler i3 of the third forward gear 3 onto the idler i4 of the fourth forward gear 4 and from there onto the second transmission input shaft w_K2 onto the idler i2 of the second forward gear 2, and, when the third shift element S3 is activated in operating direction S3b, the power flow is transmitted onto the second countershaft w_v2 to the first output gear iab1 to the output shaft w_ab.

Starting from the second clutch K2, the second forward gear 2 is shiftable via the second transmission input shaft w_K2, wherein when the third shift element S3 is activated in operating direction S3b, the power flow is transmitted over the idler i2 of the second forward gear 2 onto the second countershaft w_v2 to the first output gear iab1 to the output shaft w_ab.

Starting from the first clutch K1, the third forward gear 3 is shiftable via the first transmission input shaft w_K1, wherein when the first shift element S1 is actuated in operating direction S1a, the power flow is transmitted over the idler i3 of the third forward gear 3 onto the first countershaft w_v1 to the second output gear iab2 to the output shaft w_ab.

Starting from the second clutch K2, the fourth forward gear 4 is shiftable via the second transmission input shaft w_K2, wherein when the second shift element S2 is activated in operating direction S2a, the power flow is transmitted over the idler i4 of the fourth forward gear 4 onto the first countershaft w_v1 to the second output gear iab2 to the output shaft w_ab.

Starting from the first clutch K1, the fifth forward gear 5 is shiftable via the first transmission input shaft w_K1, wherein when the third shift element S3 is activated in operating direction S3a, the power flow is transmitted over the idler i5 of the fifth forward gear 5 onto the second countershaft w_v2 to the first output gear iab1 to the output shaft w_ab.

Starting from the second clutch K2, the sixth forward gear 6 is shiftable via the second transmission input shaft w_K2, wherein when the first shift element S1 is activated in operating direction S1b, the power flow is transmitted over the idler i4 of the fourth forward gear 4 onto the idler i3 of the third forward gear 3 and from there via the first transmission input shaft w_K1 and the idler i5 of the fifth forward gear 5, and, when the third shift element S3 is activated in operating direction S3a, the power flow is transmitted onto the second countershaft w_v2 to the first output gear iab1 to the output shaft w_ab.

Starting from the first clutch K1, a reverse gear R1 is shiftable via the first transmission input shaft w_K1, wherein when the first shift element S1 is activated in operating direction S1b, the power flow is transmitted over the idler i3 of the third forward gear 3 onto the idler i4 of the fourth forward gear 4 and from there onto the second transmission input shaft w_K2 and, when the second shift element S2 is activated in operating direction S2b, the power flow is transmitted over the idler i2 of the second forward gear 2 and the idler iR of the reverse gear R1 onto the first countershaft w_v1 to the second output gear iab2 to the output shaft w_ab.

Starting from the second clutch K2, a further reverse gear R2 is shiftable via the second transmission input shaft w_K2, wherein when the second shift element S2 is activated in operating direction S2b, the power flow is transmitted over the idler i2 of the second forward gear 2 and the idler iR of the reverse gear R2 onto the first countershaft w_v1 to the second output gear iab2 to the output shaft w_ab.

The first forward gear 1, the sixth forward gear 6, and also the reverse gear R1, are therefore shiftable as winding gears. In winding gears, gear wheels, i.e. idlers and fixed gears, of both parts of the transmission are coupled to one another, thereby realizing a power flow through both parts of the transmission.

Modifications and variations can be made to the embodiments illustrated or described herein without departing from the scope and spirit of the invention as set forth in the appended claims.

REFERENCE NUMERALS

1 First forward gear
2 Second forward gear
3 Third forward gear
4 Fourth forward gear
5 Fifth forward gear
6 Sixth forward gear
R1 Reverse gear
R2 Reverse gear
i2 Gear stage of the second forward gear
i3 Gear stage of the third forward gear
i4 Gear stage of the fourth forward gear
i5 Gear stage of the fifth forward gear
iR Gear stage of the reverse gear
F1 Fixed gear of the first transmission input shaft
F2 Fixed gear of the second transmission input shaft
F3 Fixed gear of the third transmission input shaft
S1 First dual shift element
S2 Second dual shift element
S3 Third dual shift element
S1a First operating direction of the first dual shift element
S1b Second operating direction of the first dual shift element
S2a First operating direction of the second dual shift element
S2b Second operating direction of the second dual shift element
S3a First operating direction of the third dual shift element
S3b Second operating direction of the third dual shift element
w_an Input shaft
w_ab Output shaft
w_K1 First transmission input shaft
w_K2 Second transmission input shaft
w_v1 First countershaft
w_v2 Second countershaft
K1 First clutch
K2 Second clutch
iab1 First output gear
iab2 Second output gear

The invention claimed is:

1. A dual-clutch transmission, comprising:
two clutches (K1, K2);
a drive shaft (w_an), an input side of each of the two clutches (K1, K2) connected with the drive shaft (w_an);
two coaxial input shafts (w_K1, w_K2), an output side of each of the two clutches (K1, K2) connected with a respective one of two input shafts (w_K1, w_K2),
two countershafts (w_v1, w_v2) on which a plurality of idlers (i2, i3, i4, i5, iR) is rotatably mounted;
a plurality of fixed gears (F1, F2, F3) disposed on the two input shafts (w_K1, w_K2) in a rotationally fixed manner, the plurality of fixed gears (F1, F2, F3) engaged with the plurality of idlers (i2, i3, i4, i5, iR);
two output gears (iab1, iab2), each output gear (iab1, iab2) provided on a respective one of the two countershafts (w_v1, w_v2)
an output shaft (w_ab) that is not coaxial with the drive shaft (w_an), the two output gears (iab1, iab2) being coupled to a gearing of the output shaft (w_ab); and
a plurality of shift elements (S1, S2, S3) configured such that at least six power-shiftable forward gears (1, 2, 3, 4, 5, 6) and at least one reverse gear (R1, R2) are shiftable,
wherein the plurality of shift elements (S1, S2, S3) consists of three double-acting shift elements (S1, S2, S3),
wherein two idlers of the plurality of idlers (i2, i3, i4, i5, iR) are allocated to each double-acting shift element (S1, S2, S3), wherein, in a first operating direction (S1a), a first shift element (S1) of the plurality of shift elements (S1, S2, S3) connects a second idler (i3) of the plurality of idlers (i2, i3, i4, i5, iR) with a first countershaft (w_v1) of the two countershafts (w_v1, w_v2), wherein, in a second operating direction (S1b), the first shift element (S1) of the plurality of shift elements (S1, S2, S3) connects the second idler (i3) with a third idler (i4) of the plurality of idlers (i2, i3, i4, i5, iR), and wherein a second shift element (S2) and a third shift element (S3) of the plurality of shift elements (S1, S2, S3) respectively connect associated idlers (i2, i5; i4, iR) of the plurality of idlers (i2, i3, i4, i5, iR) with the associated countershaft of the two countershafts (w_v1, w_v2) in a rotationally fixed manner.

2. The dual-clutch transmission of claim 1, wherein:
the first shift element (S1) is a shift actuator controlled double-acting shift element and is allocated to the second idler (i3) as a gear stage of a third forward gear (3) of the at least six power-shiftable forward gears (1, 2, 3, 4, 5, 6) and to the third idler (i4) as a gear stage of a fourth forward gear (4) of the at least six power-shiftable forward gears (1, 2, 3, 4, 5, 6);
the second shift element (S2) is a shift actuator controlled double acting shift element and is allocated to the third idler (i4) as a gear stage of a fourth forward gear (4) of the at least six power-shiftable forward gears (1, 2, 3, 4, 5, 6) and to a fifth idler (iR) of the plurality of idlers (i2, i3, i4, i5, iR) as a gear stage of a reverse gear (R1, R2) of the at least one reverse gear (R1, R2); and
the third shift element (S3) is a shift actuator controlled double acting shift element and is allocated to a first idler (i2) of the plurality of idlers (i2, i3, i4, i5, iR) as a gear stage of a second forward gear (2) of the at least six power-shiftable forward gears (1, 2, 3, 4, 5, 6) and to a fourth idler (i5) of the plurality of idlers (i2, i3, i4, i5, iR) as a gear stage of a fifth forward gear (5) of the at least six power-shiftable forward gears.

3. The dual-clutch transmission of claim 1, wherein the first shift element (S1) and the second shift element (S2) are allocated to the first countershaft (w_v1), and the third shift element (S3) is allocated to a second countershaft (w_v2) of the two countershafts (w_v1, w_v2).

4. The dual-clutch transmission of claim 1, wherein a first input shaft (w_K1) of two input shafts (w_K1, w_K2) is a hollow shaft and includes a first fixed gear (F1) of the plurality of fixed gears (F1, F2, F3), and a second input shaft (w_K2) of two input shafts (w_K1, w_K2) is a solid shaft and includes a second fixed gear (F2) and a third fixed gear (F3) of the plurality of fixed gears (F1, F2, F3).

5. The dual-clutch transmission of claim 1, wherein the first countershaft (w_v1) is disposed parallel to a second countershaft (w-v2) of the two countershafts (w_v1, w_v2).

6. The dual-clutch transmission of claim 1, wherein:
the second idler (i3) is allocated to the first countershaft (w_v1) as a gear stage of a third forward gear (3) of the at least six power-shiftable forward gears (1, 2, 3, 4, 5, 6);
the third idler (i4) is allocated to the first countershaft (w_v1) as a gear stage of a fourth forward gear (4) of the at least six power-shiftable forward gears (1, 2, 3, 4, 5, 6);
a fifth idler (iR) of the plurality of idlers (i2, i3, i4, i5, iR) is allocated to the first countershaft (w_v1) as a gear stage of a reverse gear (R1, R2) of the at least one reverse gear (R1, R2);
a first idler (i2) of the plurality of idlers (i2, i3, i4, i5, iR) is allocated to a second countershaft (w_v2) of the two countershafts (w_v1, w_v2) as a gear stage of a second forward gear (2) of the at least six power-shiftable forward gears (1, 2, 3, 4, 5, 6); and
a fourth idler (i5) of the plurality of idlers (i2, i3, i4, i5, iR) is allocated to the second countershaft (w_v2) as a gear stage of a fifth forward gear (5) of the at least six power-shiftable forward gears (1, 2, 3, 4, 5, 6).

7. The dual-clutch transmission of claim 1, wherein:
a first input shaft (w_K1) of two input shafts (w_K1, w_K2) includes a first fixed gear (F1) of the plurality of fixed gears (F1, F2, F3);
a second input shaft (w_K2) of two input shafts (w_K1, w_K2) includes a second fixed gear (F2) and a third fixed gear (F3) of the plurality of fixed gears (F1, F2, F3);
in a first gear plane, the first fixed gear (F1) engages with both the second idler (i3) as a gear stage of a third forward gear (3) of the first countershaft (w_v1) and a fourth idler (i5) of the plurality of idlers (i2, i3, i4, i5, iR) as a gear stage of a fifth forward gear (5) of a second countershaft (w_v2) of the two countershafts (w_v1, w_v2);
in a second gear plane, the second fixed gear (F2) engages with the third idler (i4) as a gear stage of a fourth forward gear (4) of the first countershaft (w_v1);
in a third gear plane, the third fixed gear (F3) engages a first idler (i2) of the plurality of idlers (i2, i3, i4, i5, iR) as a gear stage of a second forward gear (2); and
the first idler (i2) is in engagement with a fifth idler (iR) of the plurality of idlers (i2, i3, i4, i5, iR) as a gear stage of a reverse gear (R1, R2) of the first countershaft (w_v1).

8. The dual-clutch transmission of claim 1, wherein a first forward gear (1) of the at least six power-shiftable forward gears (1, 2, 3, 4, 5, 6) is shiftable by closing the first clutch (K1), by actuating the first shift element (S1) in the second operating direction (S1b) of the first shift element (S1), and by actuating the third shift element (S3) in a second operating direction (S3b) of the third shift element (S3);
a second forward gear (2) of the at least six power-shiftable forward gears (1, 2, 3, 4, 5, 6) is shiftable by closing the second clutch (K2) and by actuating the third shift element (S3) in the second operating direction (S3b) of the third shift element (S3);
a third forward gear (3) of the at least six power-shiftable forward gears (1, 2, 3, 4, 5, 6) is shiftable by closing the first clutch (K1) and by actuating the first shift element (S1) in the first operating direction (S1a) of the first shift element (S1);
a fourth forward gear (4) of the at least six power-shiftable forward gears (1, 2, 3, 4, 5, 6) is shiftable by closing the second clutch (K2) and by actuating the second shift element (S2) in a first operating direction (S2a) of the second shift element (S2);
a fifth forward gear (5) of the at least six power-shiftable forward gears (1, 2, 3, 4, 5, 6) is shiftable by closing the first clutch (K1) and by actuating the third shift element (S3) in a first operating direction (S3a) of the third shift element (S3); and
a sixth forward gear (6) of the at least six power-shiftable forward gears (1, 2, 3, 4, 5, 6) is shiftable by closing the second clutch (K2), by actuating the first shift element (S1) in the second operating direction (S1b) the first shift element (S1), and by actuating the third shift element (S3) in the first operating direction (S3a) of the third shift element (S3).

9. The dual-clutch transmission of claim 1, wherein:
a first reverse gear (R1) of the at least one reverse gear (R1, R2) is shiftable by closing the first clutch (K1), by actuating the first shift element (S1) in the second operating direction (S1b) of the first shift element (S1), and by actuating the second shift element (S2) in a second operating direction (S2b) of the second shift element (S2); and
a second reverse gear (R2) of the at least one reverse gear (R1, R2) is shiftable by closing the second clutch (K2) and by actuating the second shift element (S2) in a second operating direction (S2b) of the second shift element (S2).

10. The dual-clutch transmission of claim 1, further comprising at least one electric motor that is connectable or connected to one or more of: the input side of each of the two clutches (K1, K2); one of plurality of the idlers (i2, i3, i4, i5, iR); and one of the two countershafts (w_v1, w_v2).

11. A dual-clutch transmission, comprising:
two clutches (K1, K2);
a drive shaft (w_an), an input side of each of the two clutches (K1, K2) connected with the drive shaft (w_an);
two coaxial input shafts (w_K1, w_K2), an output side of each of the two clutches (K1, K2) connected with a respective one of two input shafts (w_K1, w_K2),
two countershafts (w_v1, w_v2) on which a plurality of idlers (i2, i3, i4, i5, iR) is rotatably mounted;
a plurality of fixed gears (F1, F2, F3) disposed on the two input shafts (w_K1, w_K2) in a rotationally fixed manner, the plurality of fixed gears (F1, F2, F3) engaged with the plurality of idlers (i2, i3, i4, i5, iR);
two output gears (iab1, iab2), each output gear (iab1, iab2) provided on a respective one of the two countershafts (w_v1, w_v2)
an output shaft (w_ab) that is not coaxial with the drive shaft (w_an), the two output gears (iab1, iab2) being coupled to a gearing of the output shaft (w_ab); and
a plurality of shift elements (S1, S2, S3) configured such that at least six power-shiftable forward gears (1, 2, 3, 4, 5, 6) and at least one reverse gear (R1, R2) are shiftable,
wherein the plurality of shift elements (S1, S2, S3) has only three double-acting shift elements (S1, S2, S3),
wherein two idlers of the plurality of idlers (i2, i3, i4, i5, iR) are allocated to each double-acting shift element (S1, S2, S3),
wherein, in a first operating direction (S1a), a first shift element (S1) of the plurality of shift elements (S1, S2, S3) connects a second idler (i3) of the plurality of idlers (i2, i3, i4, i5, iR) with a first countershaft (w_v1) of the two countershafts (w_v1, w_v2),
wherein, in a second operating direction (S1b), the first shift element (S1) of the plurality of shift elements (S1, S2, S3) connects the second idler (i3) with a third idler (i4) of the plurality of idlers (i2, i3, i4, i5, iR),
wherein a second shift element (S2) and a third shift element (S3) of the plurality of shift elements (S1, S2, S3) respectively connect associated idlers (i2, i5; i4, iR) of the plurality of idlers (i2, i3, i4, i5, iR) with the associated countershaft of the two countershafts (w_v1, w_v2) in a rotationally fixed manner,
wherein the first shift element (S1) is a shift actuator controlled double-acting shift element and is allocated to the second idler (i3) as a gear stage of a third forward gear (3) of the at least six power-shiftable forward gears (1, 2, 3, 4, 5, 6) and to the third idler (i4) as a gear stage of a fourth forward gear (4) of the at least six power-shiftable forward gears (1, 2, 3, 4, 5, 6),
wherein the second shift element (S2) is a shift actuator controlled double acting shift element and is allocated to the third idler (i4) as a gear stage of a fourth forward gear (4) of the at least six power-shiftable forward gears (1, 2, 3, 4, 5, 6) and to a fifth idler (iR) of the plurality of idlers (i2, i3, i4, i5, iR) as a gear stage of a reverse gear (R1, R2) of the at least one reverse gear (R1, R2), and
wherein the third shift element (S3) is a shift actuator controlled double acting shift element and is allocated to a first idler (i2) of the plurality of idlers (i2, i3, i4, i5, iR) as a gear stage of a second forward gear (2) of the at least six power-shiftable forward gears (1, 2, 3, 4, 5, 6) and to a fourth idler (i5) of the plurality of idlers (i2, i3, i4, i5, iR) as a gear stage of a fifth forward gear (5) of the at least six power-shiftable forward gears.

12. A dual-clutch transmission, comprising:
two clutches (K1, K2);
a drive shaft (w_an), an input side of each of the two clutches (K1, K2) connected with the drive shaft (w_an);
two coaxial input shafts (w_K1, w_K2), an output side of each of the two clutches (K1, K2) connected with a respective one of two input shafts (w_K1, w_K2),
two countershafts (w_v1, w_v2) on which a plurality of idlers (i2, i3, i4, i5, iR) is rotatably mounted;
a plurality of fixed gears (F1, F2, F3) disposed on the two input shafts (w_K1, w_K2) in a rotationally fixed manner, the plurality of fixed gears (F1, F2, F3) engaged with the plurality of idlers (i2, i3, i4, i5, iR);
two output gears (iab1, iab2), each output gear (iab1, iab2) provided on a respective one of the two countershafts (w_v1, w_v2)
an output shaft (w_ab) that is not coaxial with the drive shaft (w_an), the two output gears (iab1, iab2) being coupled to a gearing of the output shaft (w_ab); and
a plurality of shift elements (S1, S2, S3) configured such that at least six power-shiftable forward gears (1, 2, 3, 4, 5, 6) and at least one reverse gear (R1, R2) are shiftable,
wherein the plurality of shift elements (S1, S2, S3) has only three double-acting shift elements (S1, S2, S3),
wherein two idlers of the plurality of idlers (i2, i3, i4, i5, iR) are allocated to each double-acting shift element (S1, S2, S3),
wherein, in a first operating direction (S1a), a first shift element (S1) of the plurality of shift elements (S1, S2, S3) connects a second idler (i3) of the plurality of idlers (i2, i3, i4, i5, iR) with a first countershaft (w_v1) of the two countershafts (w_v1, w_v2),
wherein, in a second operating direction (S1b), the first shift element (S1) of the plurality of shift elements (S1, S2, S3) connects the second idler (i3) with a third idler (i4) of the plurality of idlers (i2, i3, i4, i5, iR),
wherein a second shift element (S2) and a third shift element (S3) of the plurality of shift elements (S1, S2, S3) respectively connect associated idlers (i2, i5; i4, iR) of the plurality of idlers (i2, i3, i4, i5, iR) with the associated countershaft of the two countershafts (w_v1, w_v2) in a rotationally fixed manner, wherein the second idler (i3) is allocated to the first countershaft (w_v1) as a gear stage of a third forward gear (3) of the at least six power-shiftable forward gears (1, 2, 3, 4, 5, 6), wherein the third idler (i4) is allocated to the first countershaft (w_v1) as a gear stage of a fourth forward gear (4) of the at least six power-shiftable forward gears (1, 2, 3, 4, 5, 6), wherein a fifth idler (iR) of the plurality of idlers (i2, i3, i4, i5, iR) is allocated to the first countershaft (w_v1) as a gear stage of a reverse gear (R1, R2) of the at least one reverse gear (R1, R2), wherein a first idler (i2) of the plurality of idlers (i2, i3, i4, i5, iR) is allocated to a second countershaft (w_v2) of the two countershafts (w_v1, w_v2) as a gear stage of a second forward gear (2) of the at least six power-shiftable forward gears (1, 2, 3, 4, 5, 6), and wherein a fourth idler (i5) of the plurality of idlers (i2, i3, i4, i5, iR) is allocated to the second countershaft (w_v2) as a gear stage of a fifth forward gear (5) of the at least six power-shiftable forward gears (1, 2, 3, 4, 5, 6).

* * * * *